US009587697B2

(12) United States Patent
Schubert et al.

(10) Patent No.: US 9,587,697 B2
(45) Date of Patent: Mar. 7, 2017

(54) BRAKE PAD AND METHOD FOR PRODUCING A BRAKE PAD

(71) Applicant: TMD Friction Services GmbH, Leverkusen (DE)

(72) Inventors: Maik Schubert, Leverkusen (DE); Kai Schmitz, Wermelskirchen (DE)

(73) Assignee: TMD Friction Services GmbH, Leverkusen (DE)

( * ) Notice: Subject to any disclaimer, the term of this patent is extended or adjusted under 35 U.S.C. 154(b) by 0 days.

(21) Appl. No.: 14/416,320

(22) PCT Filed: Nov. 8, 2013

(86) PCT No.: PCT/EP2013/073213
§ 371 (c)(1),
(2) Date: Jan. 22, 2015

(87) PCT Pub. No.: WO2014/075979
PCT Pub. Date: May 22, 2014

(65) Prior Publication Data
US 2015/0260249 A1      Sep. 17, 2015

(30) Foreign Application Priority Data

Nov. 16, 2012    (DE) .................... 10 2012 111 043

(51) Int. Cl.
*F16D 69/00*    (2006.01)
*F16D 69/04*    (2006.01)
(Continued)

(52) U.S. Cl.
CPC ........... *F16D 69/04* (2013.01); *F16D 65/092* (2013.01); *F16D 66/02* (2013.01);
(Continued)

(58) Field of Classification Search
CPC ............ F16D 69/04; F16D 2069/0433; F16D 2069/0441; F16D 2069/0483; F16D 66/02024
(Continued)

(56) References Cited

U.S. PATENT DOCUMENTS 2,814,684 A * 11/1957 Depascale ............. F16D 66/024
                                                          188/1.11 L
3,556,046 A *  1/1971 Dombeck ............... F16D 66/02
                                                          116/208
(Continued)

FOREIGN PATENT DOCUMENTS

DE      2 327 548 A1    12/1974
DE      94 17 974 U1     1/1995
(Continued)

OTHER PUBLICATIONS

Int'l Search Report and Written Opinion issued on Mar. 4, 2014 in Int'l Application No. PCT/EP2013/073213.

*Primary Examiner* — Christopher Schwartz
(74) *Attorney, Agent, or Firm* — Panitch Schwarze Belisario & Nadel LLP

(57) ABSTRACT

The invention relates to a brake pad (2), comprising a lining carrier (4) and a friction lining (6), which is fastened to the lining carrier (4) by means of at least one bolt (10), wherein the friction lining (6) can be worn down to a wear limit (12). The bolt (10) protrudes into the friction lining (6) to a point below the wear limit (12), such that the at least one bolt (10) remains below a friction surface (6.1) of the friction lining (6), at least if the friction lining (6) has not been worn down completely.

12 Claims, 2 Drawing Sheets

(51) Int. Cl.
  *F16D 65/092*   (2006.01)
  *F16D 66/02*    (2006.01)
(52) U.S. Cl.
  CPC ........... *F16D 2069/0433* (2013.01); *F16D 2069/0441* (2013.01); *Y10T 29/49947* (2015.01)
(58) Field of Classification Search
  USPC .................................. 188/250 B, 250 G
  See application file for complete search history.

(56) References Cited

U.S. PATENT DOCUMENTS

| | | | | |
|---|---|---|---|---|
| 3,767,018 | A * | 10/1973 | Gordon | B29C 37/0082 188/250 G |
| 3,914,734 | A * | 10/1975 | Rigalt | F16D 66/024 188/1.11 L |
| 4,146,118 | A * | 3/1979 | Zankl | F16D 69/0408 188/250 G |
| 4,363,580 | A * | 12/1982 | Bell | F16B 19/10 411/15 |
| 4,606,435 | A * | 8/1986 | Johnson | F16D 66/024 188/1.11 L |
| 5,480,008 | A | 1/1996 | Hummel et al. | |
| 6,913,120 | B2 * | 7/2005 | Bosco | F16D 65/092 188/250 E |
| 7,886,881 | B2 | 2/2011 | Goldbach et al. | |

FOREIGN PATENT DOCUMENTS

| | | |
|---|---|---|
| DE | 695 02 327 T2 | 10/1998 |
| DE | 197 40 597 B4 | 3/1999 |
| DE | 10 2004 038 804 A1 | 2/2006 |
| DE | 10 2008 014 550 A1 | 12/2010 |
| EP | 1 567 783 B1 | 10/2006 |
| GB | 264479 A | 4/1928 |
| GB | 1 436 064 A | 5/1976 |
| WO | 02/23060 A1 | 3/2002 |

* cited by examiner

BRAKE PAD AND METHOD FOR PRODUCING A BRAKE PAD

CROSS-REFERENCE TO RELATED APPLICATIONS

This application is a national stage application (under 35 USC §371) of PCT/EP2013/073213, filed Nov. 8, 2013, which claims benefit of German application 10 2012 111 043.3, filed Nov. 16, 2012.

BACKGROUND OF THE INVENTION

Technical Field and State of the Art

The invention relates to a brake shoe having a lining carrier and a friction lining, whereby the friction lining is attached to the lining carrier by means of at least one bolt. In this context, the friction lining can be worn down to a wear limit.

Brake shoes of the above-mentioned type are known from the state of the art. Brake shoes, especially brake shoes for disc brakes, often have very similar basic structures. A friction lining is applied onto a lining carrier. During braking, the friction lining establishes frictional contact with a brake disc or a brake drum, a process in which kinetic energy is converted into thermal energy. As a rule, the friction lining is a wearing part that wears down during operation. It is common for friction linings to have a defined wear limit down to which the brake shoes can be used. After that, they should be replaced. During braking, the lining carrier absorbs the occurring forces and dissipates them.

European patent specification EP 1 567 783 B1 discloses a disc brake, especially a brake block, comprising a lining carrier and a friction lining, whereby at least one bolt is situated on the lining carrier for purposes of securing the friction lining, whereby the bolt passes through the friction lining, starting approximately from the middle of the lining carrier up to approximately the surface of the lining, whereby the bolt is made of a non-ferrous metal and the bolt wears down together with the friction lining during braking operation. The bolt is welded to the lining carrier. The bolt can be made of brass.

German utility model DE 94 17 974 U1 discloses a brake shoe having a lining carrier plate with a disc brake lining pressed onto it as well as a damping plate that has been applied onto the other side of the lining carrier plate. For attachment purposes, the damping plate is screwed onto the disc brake lining with at least two flat countersunk screws which are made of brass and which each extend through a hole in the lining carrier plate, or else the damping plate is glued onto the disc brake lining for purposes of achieving additional vibration damping. Here, the thread of the screw engages with a blind hole in the disc brake lining. The head section of the flat countersunk screw has a drilled blind hole to receive an inserted contact piece for a wear indicator. Here, the flat countersunk screw serves as the contact for a wear indicator. The flat countersunk screw should penetrate deep enough into the friction compound so that, due to the friction lining wearing down, contact is made with the brake disc before the friction compound has been completely worn off.

German translation of a European Patent Specification DE 695 02 327 T2 discloses a brake lining module having a metal baseplate with a friction lining arranged thereupon. The friction lining is mechanically attached to the baseplate by means of rivets. In this context, the rivets extend approximately halfway into the friction lining.

German patent document DE 10 2008 014 550 B4 discloses a brake lining carrier plate which makes use of bolts that have been pressed into the plate in order to attach a brake lining to the brake lining carrier plate. For this purpose, the brake lining carrier plate has several depressions into which the bolts engage. The holding bolts are made of a metal material whose friction-wear properties are the same as or less than those of the brake lining material.

German patent document DE 197 40 597 B4 discloses a disc brake consisting of a friction lining and a lining carrier, whereby the lining carrier is joined to the friction lining by various fastening means. In order to manufacture the disc brake, the friction lining is pressed in its hot state onto the lining carrier, as a result of which the above-mentioned fastening means are enclosed by the friction lining, thereby holding the latter with a positive fit.

German laid-open document DE 23 27 548 A discloses a brake shoe wherein the friction lining is replaceably attached to a carrier by means of rivets or screws. Such friction linings can only be worn down to an extent that matches the thickness of the rivet or screw head.

European patent EP 1 567 783 B1 discloses a disc brake that consists of a lining carrier and a friction lining. The friction lining is attached to the lining carrier by means of a bolt made of a non-ferrous metal that wears down together with the friction lining during braking operation.

International patent application WO 02/23060 A1 describes a brake shoe having a friction lining for a drum brake. The friction lining has one or more grooves on its surface. The brake shoe can be employed in a cooled drum brake system in which cooling is provided by means of ventilation openings in the drum.

German patent application DE 10 2004 038 804 A1 discloses a clutch disk on which a friction lining is arranged directly or indirectly via a carrier element. The friction lining is joined to the clutch disk by means of a fastening element in the form of a mating sleeve that extends into a hole in the clutch disk. The press fit in the clutch disk is created employing a tool with a truncated-conical end section that is inserted into the interior of the mating sleeve.

British patent document GB 264,479 refers to a friction lining that is glued onto a carrier plate that serves as an intermediate carrier. This intermediate carrier is joined to the actual carrier element by means of rivets, screws or bolts so that the friction lining can be easily replaced.

A drawback of the state of the art is that, on the one hand, the production of the disc brake is relatively labor-intensive and, on the other hand, the bolt has an influence on the braking behavior as well as the on the level of noise. Adjusting such a disc brake is considerably more difficult—and only within a narrower margin—than in the case of brake shoes in which the selection of the material is completely free.

Before this backdrop, it is the objective of the present invention to refine a brake shoe of the above-mentioned type so that it can be produced more easily and can also be better adjusted.

BRIEF SUMMARY OF THE INVENTION

A brake shoe according to the invention has a lining carrier and a friction lining, wherein the friction lining is attached to the lining carrier by means of at least one bolt. The at least one bolt allows a good introduction of force from the friction lining into the lining carrier. In the area of their connection, the bolts reduce the shear forces between the friction lining and the lining carrier since said forces are dissipated via the at least one bolt.

The friction lining can be worn down to a wear limit that is a function of the specific application purpose and the wear is not allowed to fall below this limit during proper operation.

According to an embodiment of the invention, it is provided that the bolt extends into the friction lining to below or down to the wear limit, so that the at least one bolt is below a friction surface of the friction lining, at least if the friction lining has not been worn down all the way to the wear limit. This prevents the bolt from coming into contact with the friction counterpart of the brake shoe, for instance, a brake disc or a brake drum, during regular operation. Thanks to the invention, it is achieved that it is only the friction lining itself that always interacts with the associated friction counterpart, which simplifies the design of the friction lining in terms of noise generation and braking behavior.

When the bolt extends down to the wear limit, it is also possible to utilize the changing braking and/or noise behavior as an indication of wear in case of suddenly occurring interactions between the bolt and the friction counterpart once the wear limit has been reached.

According to a first possible additional embodiment of the invention, it can be provided that the lining carrier is made of a first material while the at least one bolt is made of a second material, wherein the second material is softer than the first material, in other words, the first material is harder than the second material. In this manner, the at least one bolt can be oversized and, while it is being pressed in, it can deform in such a way that the bolt is affixed positively as well as non-positively in the lining carrier. In comparison to fixation by welding, this method saves work steps and energy, so that this method can be carried out more cost-effectively than welding methods.

According to another possible embodiment of the invention, it can be provided that the at least one bolt is pressed into the lining carrier. This achieves that the connection thus created can withstand high temperatures and high loads.

According to another possible embodiment of the invention, it can be provided that the second material is weaker than the first material. This makes it easier to drive the bolt into the lining carrier.

According to another possible embodiment of the invention, it can be provided that the lining carrier has at least one offset or at least one through-passage to receive the at least one bolt, wherein the offset or the through-passage has a smaller clearance than the at least one bolt. As a result, when the at least one bolt is pressed in, it is deformed as it is driven into the at least one offset or into the at least one through-passage.

According to another possible embodiment of the invention, it can be provided that the friction lining has at least one offset or a through-passage to receive the at least one bolt. This makes it easier to drive the at least one bolt into the friction lining.

According to another possible embodiment of the invention, an interlayer can be provided between the lining carrier and the friction lining. This interlayer serves to provide damping between the lining carrier and the friction lining, thus optimizing the noise behavior during braking.

According to another possible embodiment of the invention, the at least one bolt can have a head that is situated on the side of the lining carrier facing away from the friction lining. Therefore, according to the invention, the bolt is driven into the lining carrier from the back and passes through it completely, thus firmly securing the at least one bolt in the lining carrier.

The opposite configuration is likewise conceivable according to the invention. whereby the head of the bolt is arranged on the friction lining side.

According to another possible embodiment of the invention, a damping plate is arranged on the side facing away from the lining carrier.

According to a conceivable embodiment, the bolt can be pressed into the lining carrier and into the damping plate, as a result of which the damping plate is affixed to the lining carrier and does not impair the function of the damping plate.

According to an alternative embodiment, the bolt can project beyond the side of the lining carrier facing away from the friction lining. In this manner, the bolt constitutes an anchoring point for the damping plate.

A first independent subject matter of the invention relates to a method for the production of a brake shoe, whereby the method comprises the following steps:

providing a lining carrier and at least one bolt;

providing friction material and/or an interlayer and/or a friction lining with or without an interlayer;

positioning the lining carrier plate relative to the friction material and/or to the interlayer and/or to the friction lining with or without an interlayer as well as pressing the at least one bolt to the lining carrier plate as well as pressing the lining carrier plate to the friction material and/or to the interlayer and/or to the friction lining with or without an interlayer.

The order of the third and fourth steps can also be switched, so that the pressing of the at least one bolt takes place before the positioning of the lining carrier relative to the friction material and/or to the interlayer and/or to the friction lining with or without an interlayer.

According to another first possible embodiment of the method according to the invention, it can be provided that the at least one bolt is inserted into a through-passage of the lining carrier before the friction lining is positioned relative to the lining carrier plate.

According to another first possible embodiment of the method according to the invention, it can be provided that the pressing procedure is carried out with a pressing punch that has a projection and wherein the bolt is pressed by means of the projection. The pressing can be force-controlled or path-controlled. In the case of path control, the bolt can be pressed to a prescribed depth into the lining carrier plate.

The method according to the invention is especially carried out in order to produce a brake shoe according to the inventive idea described above.

Additional objectives, features and advantageous application possibilities of the invention ensue from the description below of an embodiment with reference to the drawings. In this context, all of the described and/or depicted features, either on their own or in any meaningful combination, constitute the subject matter of the present invention, also irrespective of their compilation in the claims or the claims to which they refer back.

BRIEF DESCRIPTION OF THE SEVERAL VIEWS OF THE DRAWINGS

The following is schematically shown:

FIG. 3 the pressing of a brake shoe according to the invention; as well as

DETAILED DESCRIPTION OF THE INVENTION

Figure 1:
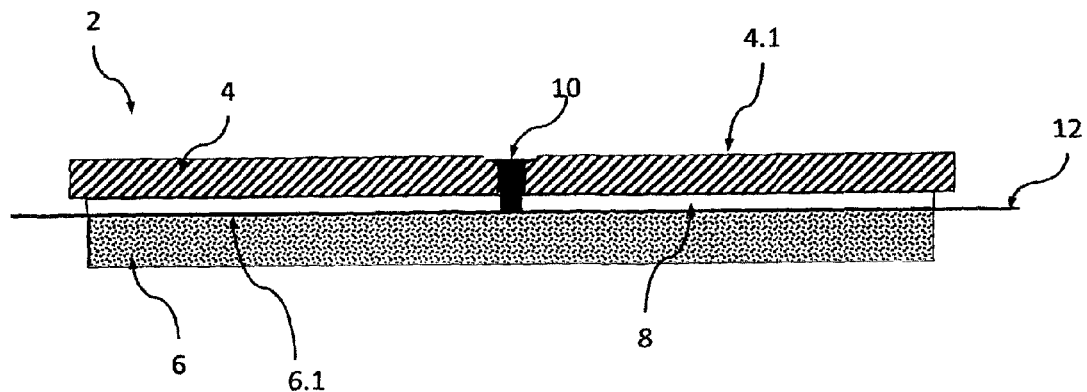
FIG. 1 a cross-sectional view through a brake shoe according to the invention, in a first configuration.

In the embodiments below, for the sake of clarity, identical or functionally identical parts are provided with the same reference numerals.

FIG. 1 shows a brake shoe 2 according to the invention in a cross-sectional view.

As the lining carrier for the brake shoe 2, a lining carrier plate 4 is provided to which a friction lining 6 is connected. The connection between the lining carrier plate 4 and the friction lining 6 is achieved by means of an interlayer 8.

The lining carrier plate of the above-mentioned embodiment is made of titanium. Lining carrier plates made of titanium have properties that are particularly well-suited for brake shoes. However, the invention can also be implemented with lining carrier plates made of materials other than titanium.

A bolt 10 is pressed into the lining carrier plate 4 from the bottom 4.1 of the lining carrier plate 4. The bolt 10 is made of a material such as, for instance, brass, that is softer than the titanium used for the lining carrier plate 4.

The bolt 10 passes completely through the lining carrier plate 4 and extends into the friction lining 6.

The friction lining 6 has a wear limit 12 that is very close to the interlayer 8. The bolt 10 extends to the appertaining wear limit 12. During regular operation, the bolt 10 is covered by a layer of the friction lining 6.

Thanks to the pressing of the bolt 10 into the lining carrier plate 4, shear stresses on the brake shoe 2 generated during braking can be dissipated via the screw 10 into the lining carrier plate so that the shear force that is to be dissipated via the interlayer 8 drops and the brake shoe 2 lasts longer.

Figure 2:
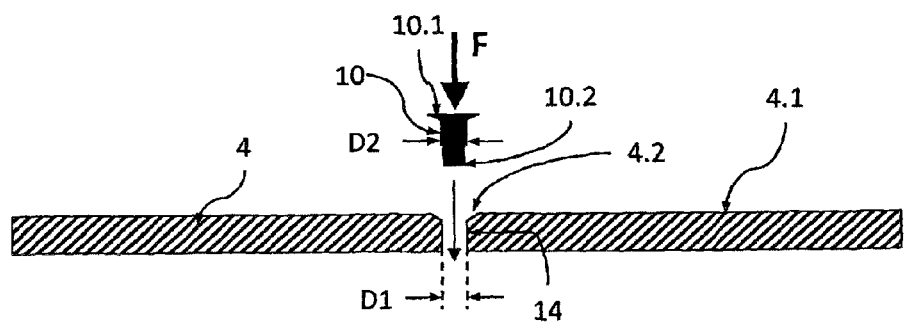
FIG. 2 method steps for the production of a brake shoe according to the invention.

FIG. 2 shows a method step during the production of a brake shoe 2 according to the invention.

In the method step shown, the bolt 10 is pressed from the top 4.1 of the lining carrier plate 4 into a through-passage 14 in the lining carrier plate 4. The through-passage 14 has a clearance D1 that is smaller than the clearance D2 of the bolt 10. The through-passage 14 widens conically in the area of the top 4.1 of the lining carrier plate 4. The head 10.1 of the bolt 10 as well as the material of the bolt 10 that deforms when it is pressed in can both be accommodated in the conical widened section 4.2, so that the bolt 10 does not extend beyond the top 4.1 of the lining carrier plate 4.

The bolt 10 has a lower end area 10.2 that has a smaller diameter than the through-passage 14. This facilitates the insertion and positioning of the bolt 10.

Figure 3:
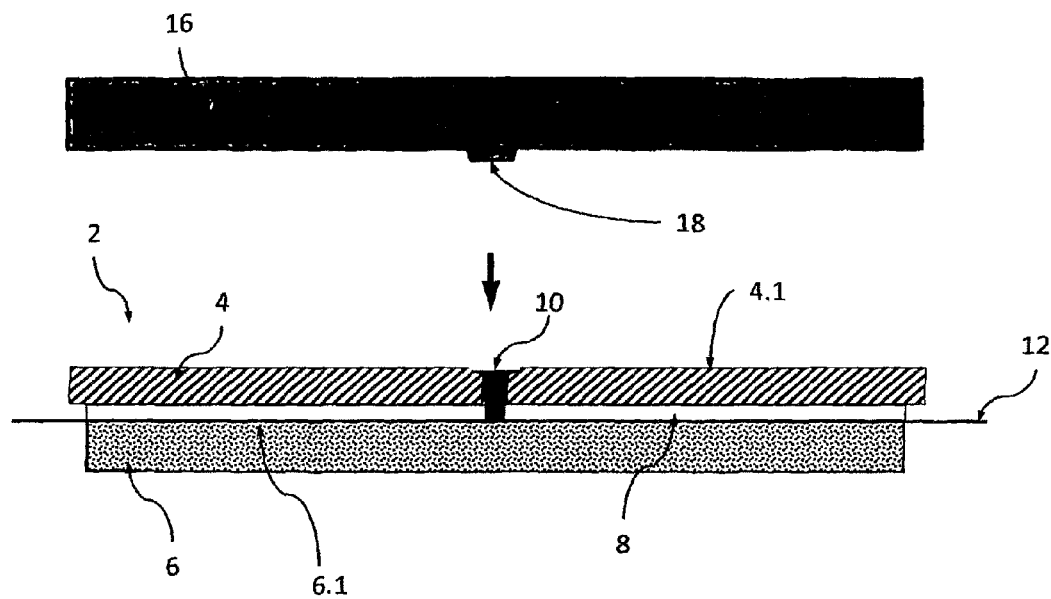

FIG. 3 shows the pressing of a brake shoe 2 according to the invention.

For the pressing procedure, a press punch 16 is employed that is pressed from the top 4.1 of the lining carrier plate 4 onto the brake shoe 2 that is to be pressed. The press punch 16 has a projection 18 that is configured to press the bolt 10 into the through-passage 14 of the lining carrier plate 4.

The pressing procedure is path-controlled in order to press the bolt 10 to a certain depth into the lining carrier plate 4.

Figure 4:
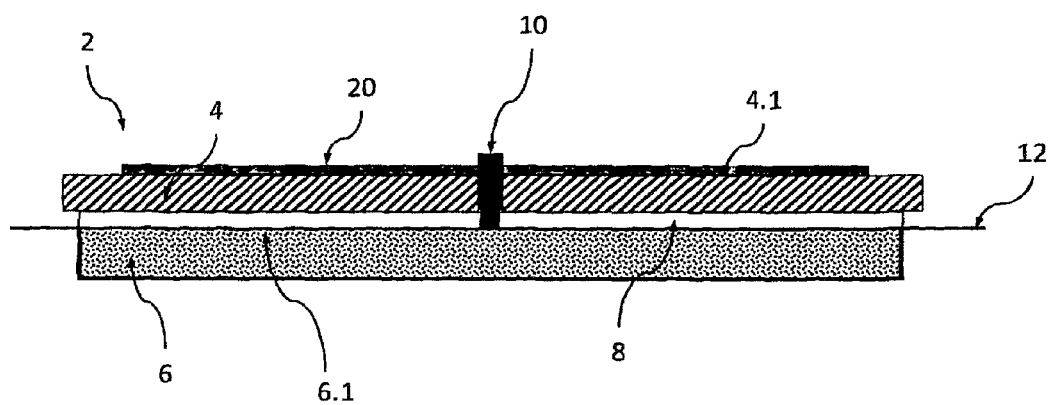
FIG. 4 a cross-sectional view through a brake shoe according to the invention, in a second configuration.

FIG. 4 shows an alternative embodiment of the brake shoe 2' according to the invention.

A damping plate 20 is arranged on the top 4.1 of the lining carrier plate 4. The damping plate 20 is affixed to the lining carrier plate 4 by means of the bolt 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE NUMERALS 2, 2' brake shoe
4 lining carrier plate
4.1 top
4.2 conical widened section
6 friction lining
6.1 friction surface
8 interlayer
10 bolt
10.1 bolt head
10.2 lower end area
12 wear limit
14 hole
16 press punch
18 punch projection
20 damping plate
D1 clearance of the hole 14
D2 diameter of the bolt 10

The invention claimed is:

1. A brake shoe, comprising:
a lining carrier (4) having an upper side (4.1) and a side opposite the upper side, and having at least one through passage (14) of a first diameter (D1) extending through the lining carrier (4) from the upper side (4.1) to the side opposite the upper side; and
a friction lining (6) with a friction surface (6.1) that is attached to the lining carrier (4) with the friction surface (6.1) facing the side opposite the upper side of the lining carrier (6) by means of at least one bolt (10) of deformable material, said at least one bolt (10) having a shank of a second diameter (D2) that is larger than the first diameter (D1), wherein the friction lining (6) can be worn down to a wear limit (12), and wherein the at least one bolt (10) shank is pressed into the at least one through passage (14) of the lining carrier in a pressing direction from the upper side (4.1) of the lining carrier and extends into the friction lining (6) to below the wear limit (12), so that a portion of the bolt shank remains below the friction surface (6.1) of the friction lining (6), at least if the friction lining (6) has not been worn down completely.

2. The brake shoe according to claim 1, wherein the lining carrier (4) is made of a first material while the at least one bolt (10) is made of a second material, and wherein the second material is softer than the first material.

3. The brake shoe according to claim 2, wherein the second material has a lower shear strength than the first material.

4. The brake shoe according claim 1, further comprising a damping plate (20) arranged on the upper side (4.1) of the lining carrier (4).

5. The brake shoe according to claim 4, wherein the bolt (10) is pressed into the lining carrier (4) and into the damping plate (20).

6. The brake shoe according to claim 1, wherein the offset or the through-passage (14) has a smaller clearance than the at least one bolt (10).

7. The brake shoe according to claim 1, further comprising an interlayer (8) between the lining carrier (4) and the friction lining (6).

8. The brake shoe according to claim 1, wherein the at least one bolt (10) has a head (10.1), and wherein the head (10.1) of the at least one bolt (10) is situated on the side (4.1.) of the lining carrier (4) facing away from the friction lining (6).

9. The brake shoe according to claim 1, wherein the bolt projects beyond the upper side (4.1) of the lining carrier (4) facing away from the friction lining (6).

10. A method for the production of a brake shoe, comprising:
   providing a lining carrier (4) having an upper side (4.1) and a side opposite the upper side, and having at least one offset and at least one through passage (14) extending through the lining carrier (4) from the upper side (4.1) to the side opposite the upper side, wherein said at least one through passage has a first diameter (D1);
   providing at least one bolt (10) of deformable material, wherein said bolt (10) has a shank of a second diameter (D2) that is larger than the first diameter (D1);
   providing friction material (6) with or without an interlayer (8);
   positioning the lining carrier plate (4) relative to the friction material with or without an interlayer;
   inserting and pressing the shank of the at least one bolt (10) into the at least one offset and at least one through passage (14) through the lining carrier (4) from the upper side (4.1) to the side opposite the upper side; and
   pressing the lining carrier (4) and the at least one bolt (10) to the friction material (6) with or without an interlayer (8).

11. The method according to claim 10 wherein pressing is carried out with a pressing punch (16) that has a projection (18) and wherein the bolt (10) is pressed by means of the projection (18).

12. A brake shoe, comprising:
   a lining carrier defining a conical through passage having a maximum diameter; and
   a friction lining having a friction surface and having a depth below the friction surface that extends beyond a wear limit of the friction lining,
   said friction lining attached to the lining carrier with a portion of a shank of at least one bolt of deformable material, said bolt shank having an unpressed starting diameter that is larger than the maximum diameter of the conical through passage, with the shank of the at least one bolt pressed into the lining carrier and deformed as it is so pressed to conform to the shape of the conical through passage, with a top of the at least one bolt not extending beyond the top of the lining carrier and a bottom portion of the shank of the at least one bolt extending into the friction lining to below the wear limit, so that the bottom portion of the shank of the at least one bolt remains below the friction surface of the friction lining until the friction lining is worn down completely.

\* \* \* \* \*